United States Patent
Long et al.

(10) Patent No.: US 9,948,845 B2
(45) Date of Patent: Apr. 17, 2018

(54) DEVICE FOR MULTI-ANGLE PHOTOGRAPHING IN EYEGLASSES AND EYEGLASSES INCLUDING THE DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jun Long, Beijing (CN); Yong Song, Beijing (CN); Hongkun Zhang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/525,496

(22) PCT Filed: Aug. 9, 2016

(86) PCT No.: PCT/CN2016/094161
§ 371 (c)(1),
(2) Date: May 9, 2017

(87) PCT Pub. No.: WO2017/128692
PCT Pub. Date: Aug. 3, 2017

(65) Prior Publication Data
US 2018/0077329 A1    Mar. 15, 2018

(30) Foreign Application Priority Data

Jan. 26, 2016 (CN) .......................... 2016 1 0051642

(51) Int. Cl.
*H04N 5/232* (2006.01)
*H04N 5/225* (2006.01)
(Continued)

(52) U.S. Cl.
CPC .......... *H04N 5/2257* (2013.01); *G02C 11/10* (2013.01); *G03B 17/561* (2013.01);
(Continued)

(58) Field of Classification Search
CPC ............. H04N 5/2257; H04N 5/23238; H04N 5/23206; G03B 17/561
(Continued)

(56) References Cited

U.S. PATENT DOCUMENTS

2009/0146916 A1* 6/2009 Moliton ............. G02B 27/0176
345/8
2011/0270353 A1 11/2011 Greenberg et al.
(Continued)

FOREIGN PATENT DOCUMENTS

CN    201118759 Y    9/2008
CN    201993548 U    9/2011
(Continued)

OTHER PUBLICATIONS

China Search Report, Application No. 201610051642.3, dated May 4, 2016, 6 pps.
(Continued)

*Primary Examiner* — Usman Khan
(74) *Attorney, Agent, or Firm* — Armstrong Teasdale LLP

(57) ABSTRACT

A device for multi-angle photographing in eyeglasses and eyeglasses including the device are disclosed. The device includes a camera mounted on the eyeglasses and configured to capture an image, at least two motors configured to drive the camera to move, and at least two mobile platforms, each of which is provided with a plurality of limiting stoppers.

(Continued)

The camera is connected between respective limiting stoppers of the at least two mobile platforms through the at least two motors, and is driven by the motors to move between the limiting stoppers of the mobile platforms to implement multi-angle photographing. Thus the camera can be moved between the limiting stoppers at different levels, to realize multi-angle and multi-gesture photographing and viewfinding in the horizontal and vertical directions.

18 Claims, 2 Drawing Sheets

(51) Int. Cl.
  *G03B 17/56* (2006.01)
  *G02C 11/00* (2006.01)
(52) U.S. Cl.
  CPC ....... *H04N 5/2252* (2013.01); *H04N 5/23206* (2013.01); *H04N 5/23238* (2013.01)
(58) Field of Classification Search
  USPC ...................................................... 348/211.9
  See application file for complete search history.

(56) References Cited

U.S. PATENT DOCUMENTS

| | | | |
|---|---|---|---|
| 2012/0281961 A1* | 11/2012 | Forbes | H04N 5/77 386/224 |
| 2013/0274825 A1 | 10/2013 | Greenberg et al. | |
| 2015/0168741 A1* | 6/2015 | Esmaeili | G02C 5/001 351/115 |

FOREIGN PATENT DOCUMENTS

| | | |
|---|---|---|
| CN | 202634612 U | 12/2012 |
| CN | 204347369 U | 5/2015 |
| CN | 104796618 A | 7/2015 |
| CN | 105217051 A | 1/2016 |
| CN | 105487261 A | 4/2016 |

OTHER PUBLICATIONS

China Office Action, Application No. 201610051642.3, dated Jun. 17, 2016, 5 pps.
PCT (CN) International Search Report and Written Opinion, Application No. PCT/CN2016/094161, dated Oct. 26, 2016, 13 pps.
English Translation of PCT (CN) Written Opinion, Application No. PCT/CN2016/094161, dated Oct. 26, 2016, 5 pps.

* cited by examiner

DEVICE FOR MULTI-ANGLE PHOTOGRAPHING IN EYEGLASSES AND EYEGLASSES INCLUDING THE DEVICE

CROSS REFERENCE TO RELATED APPLICATIONS

This application is a National Stage Entry of PCT/CN2016/094161 filed on Aug. 9, 2016, which claims the benefit and priority of Chinese Application No. 201610051642.3 filed on Jan. 26, 2016, the disclosures of which are incorporated by reference herein in their entirety as part of the present application.

BACKGROUND

The present disclosure generally relates to the field of smart eyeglasses, and more particularly, to a device for multi-angle photographing in eyeglasses and eyeglasses including the device.

Eyeglasses are a kind of simple optical device for correcting visual acuity or protecting eyes, which are consisted of lenses and an eyeglass frame. There are four types of eyeglasses for correcting visual acuity: myopia eyeglasses, hypermetropia eyeglasses, presbyopia eyeglasses, and astigmatism eyeglasses. The eyeglasses are not only tools for protecting eyes but also decorations for beauty. However, the eyeglasses have no function other than visual acuity correction and decoration. With the development of sciences and technologies, the eyeglasses are endowed with important missions, particularly in the nowadays society. People often go to a tour and need to carry photographic devices such as a camera. Combining the photographic devices with the eyeglasses will facilitate traveling and sightseeing for people and provide great convenience for some special works such as investigation and diving.

Chinese Patent Application No. CN201120004645.4 discloses eyeglasses for photographing, which include an eyeglass frame, a miniature camera, a Bluetooth wireless transmitter/receiver, and a terminal receiver. The miniature camera fits with the eyeglass frame. A slot for fixing the miniature camera is arranged in a middle part of the eyeglass frame. The miniature camera is arranged inside the slot and connected to the Bluetooth wireless transmitter/receiver. The miniature camera captures an image after receiving a command signal sent from the terminal receiver. The image captured by the miniature camera is directly transmitted to the terminal receiver through the Bluetooth wireless transmitter/receiver. In this way, the image captured by the miniature camera can be transmitted to the terminal receiver promptly and effectively, which guarantees acquisition, storage and later utilization of the information in time. This avoids loss of information caused by external environment problems. Chinese Patent No. CN204347369U discloses a pair of photographing eyeglasses easily and reliably fixed. However, the above mentioned eyeglasses neither implement multi-angle rotatable photographing in horizontal and vertical directions, nor implement large-angle continuous photographing in the horizontal and vertical dimensions, for panoramically photographing and shooting.

BRIEF DESCRIPTION

Embodiments of the present disclosure provide smart eyeglasses for photographing, which is capable of implementing multi-angle rotatable photographing in the horizontal and vertical directions, large-angle continuously photographing in two dimensions and thus panoramically photographing and shooting.

An aspect of the present disclosure provides a device for multi-angle photographing in eyeglasses. The device includes a camera mounted on the eyeglasses and configured to capture an image, at least two motors configured to drive the camera to move, and at least two mobile platforms, each of which is provided with a plurality of limiting stoppers. The camera is connected between the respective limiting stoppers of the at least two mobile platforms through the at least two motors, and is driven by the motors to move between the limiting stoppers of the mobile platforms to implement multi-angle photographing.

Another aspect of the present disclosure provides eyeglasses including the aforementioned device for multi-angle photographing.

The device for multi-angle photographing in eyeglasses according to the embodiments of the present disclosure can utilize two motors to control the camera to rotate in the vertical direction. The two mobile platforms can support the camera and the motors. The two mobile platforms each have a structure with a plurality of limiting stoppers for limiting the motors, so that the camera can be moved between the multi-level limiting stoppers to implement multi-angle and multi-gesture photographing and viewfinding in the horizontal and vertical directions.

BRIEF DESCRIPTION OF THE DRAWINGS

The embodiments of the present disclosure can be better understood by reference to the following detailed description of the embodiments in conjunction with the accompanying drawings, in which.

DETAILED DESCRIPTION

Specific exemplary embodiments of the inventive subject matter now will be described with reference to the accompanying drawings. This inventive subject matter may, however, be embodied in many different forms and should not be construed as limited to the embodiments set forth herein, rather, these embodiments are provided so that this disclosure will be thorough and complete, and will fully convey the scope of the inventive subject matter to those skilled in the art.

Figure 1:
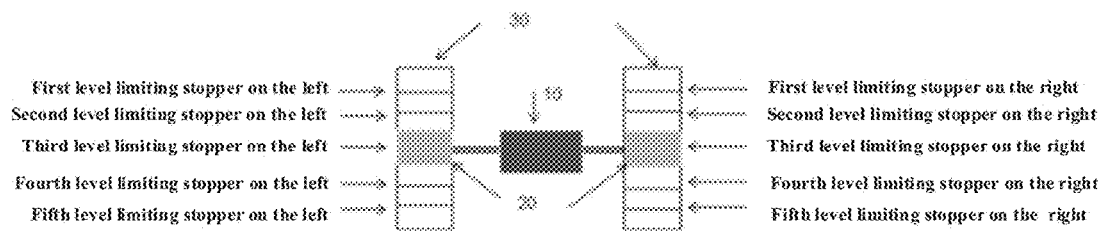
FIG. 1 is a top view of an exemplary structure of the device for multi-angle photographing in eyeglasses according to an embodiment of the present disclosure.

Embodiments of the present disclosure provide the device for multi-angle photographing in eyeglasses, which is capable of implementing multi-angle rotatable photographing in the horizontal and vertical directions, large-angle continuously photographing in two dimensions and thus panoramically photographing and shooting. As shown in FIG. 1, the device for multi-angle photographing in eyeglasses may include a camera 10 mounted on the eyeglasses and configured to capture an image, at least two motors 20 configured to drive the camera to move, and at least two mobile platforms 30, each of which is provided with a plurality of limiting stoppers. The camera may be connected between the respective limiting stoppers of the at least two mobile platforms through the at least two motors, and is driven by the motors to move between the limiting stoppers of the mobile platforms to implement multi-angle photographing.

A device for multi-angle photographing in eyeglasses and eyeglasses including the device are provided by the present disclosure. Two motors are used to control a camera 10 to rotate in vertical direction. Two mobile platforms are employed to support the camera 10 and the motors 20. The two mobile platforms 30 have a structure with a plurality of limiting stoppers for limiting the motors, so that the camera 10 can be moved between the multi-level limiting stoppers to implement multi-angle and multi-gesture photographing and viewfinding in the horizontal and vertical directions.

Figure 2:
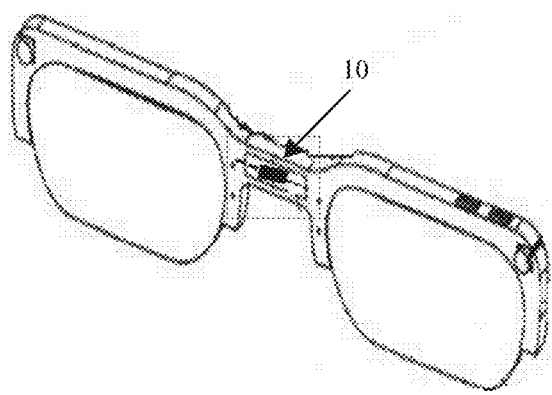
FIG. 2 is a perspective view of the eyeglasses for multi-angle photographing according to an embodiment of the present disclosure.
Figure 3:
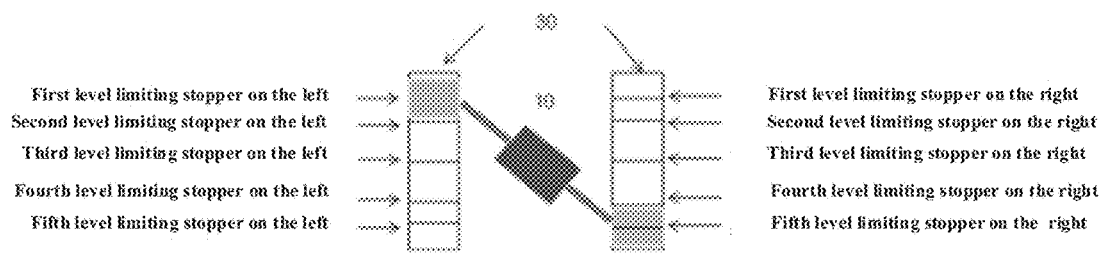
FIG. 3 is a schematic diagram illustrating the device for multi-angle photographing in eyeglasses which takes an image at the maximum angle towards the left side in the horizontal direction.
Figure 4:
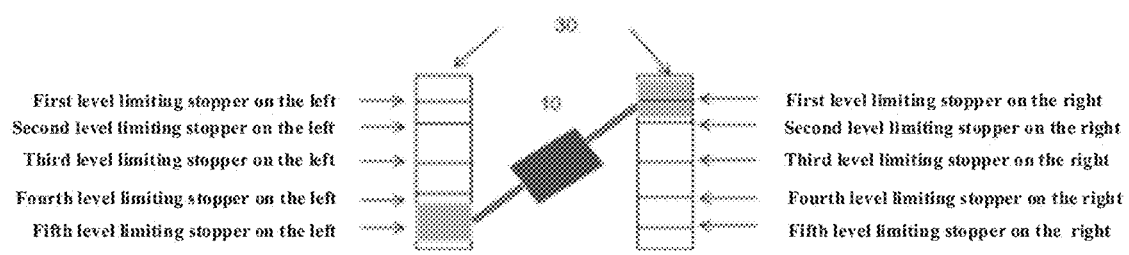
FIG. 4 is a schematic diagram illustrating the device for multi-angle photographing in eyeglasses which takes an image at the maximum angle towards the right side in the horizontal direction.

The motors 20 may be micro motors or servo motors, and may be configured to set the rotation angle and direction of the camera 10. The camera 10 may be mounted, for example, in a nose bridge area in the middle of the eyeglasses, as shown in FIG. 2. The micro motors for controlling the camera 10 to rotate in vertical direction at multi-angle are mounted on the mobile platforms at left and right sides. The mobile platform at each side has multilevel limiting stoppers (which may be, for example, three-level, five-level and seven-level) to control the micro motors to stop on each stopper of the mobile platforms. With the coordination of the mobile platforms at left and right sides, it is possible to implement the multi-angle and multi-gesture photographing in the horizontal direction for the camera, as shown in FIG. 3 and FIG. 4. FIG. 3 illustrates a scenario in which the device can take an image at the maximum angle towards the left side in the horizontal direction, and FIG. 4 illustrates a scenario in which the device can take an image at the maximum angle towards the right side in the horizontal direction.

Main functional parts for implementing multi-angle and multi-gesture photographing in the horizontal and vertical directions of the device for multi-angle photographing in eyeglasses have been described above. Additionally, the device may further include other additional functional parts, for example, a physical switch button, a USB interface, a wireless communication module, and a motor control module, which are integrated on a side face of the eyeglass frame. The additional functional parts will be introduced in detail one by one in the following description.

According to an embodiment, the device may further include a motor control module configured to control the motors 20 to drive the camera 10 to move between the limiting stoppers of the mobile platforms 30 in accordance with a desired photographing angle. The motor control module may transmit an instruction to the motors to drive the camera to photograph in accordance with a desired angle.

Figure 5:
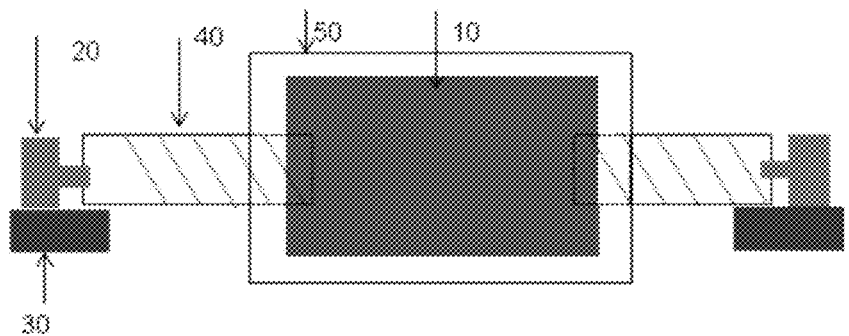
FIG. 5 is a sectional view of the device for multi-angle photographing in eyeglasses according to an embodiment of the present disclosure.

According to an embodiment, the device may further include connectors 40. As shown in FIG. 5, the connectors 40 connect the motors under camera and move the camera 10 with the control of the motors 20. The connectors 40 may be, for example, a stud, through which rotation is transmitted.

According to an embodiment, the device may further include a transmission module configured to receive the instruction from a mobile phone or a remote device and transmit the instruction to the motor control module control the movement of the camera. The transmission module may be, for example, a wireless communication module.

According to an embodiment, the device may further include an interface module configured to store the image captured by the camera in a storage device. The interface module may be, for example, a USB interface. On the side face of the eyeglass frame of the eyeglasses, a physical switch button may be set for turning on or turn off the motors, a USB interface may be set for data storage and interaction, and a wireless communication module may be set for interactive communication with a mobile phone, thereby controlling and setting photographing angles by an APP of the mobile phone.

According to an embodiment, the device may further include a protective housing 50 and/or a switch. As shown in FIG. 5, the protective housing 50 is connected to the connector 40, and configured to accommodate the camera 10. The switch is configured to turn on or turn off the camera.

A connection structure for each functional part of the device for multi-angle photographing in eyeglasses provided by the present disclosure will be illustrated below. The micro camera may be mounted in the nose bridge area in the middle of the eyeglasses, as shown in FIG. 5. According to an exemplary embodiment, the micro camera is connected and fixed to the protective housing, and a small threaded hole is formed at both sides of the protective housing. The micro camera is connected to the micro motors by bolts. The motors, each at a side, are mounted on the corresponding mobile platforms. The motors rotate in response to the instruction received from the motor controller, and drive the camera to rotate though the bolts, so as to implement multi-angle and multi-gesture adjustment in the horizontal and vertical directions to implement multi-angle rotationally and continuously photographing in the horizontal and vertical directions.

The present disclosure further provides eyeglasses including the device for multi-angle photographing in eyeglasses according to the above embodiments.

The eyeglasses provided by the present disclosure may achieve multi-angle photographing, which include the camera additionally arranged in the nose bridge area for implementing multi-angle rotation in the horizontal and vertical directions and implementing continuously photographing at different angle and with different gesture in two directions. The control switch, the USB interface, the wireless communication module and a micro sensing device also may be added to the side faces of the eyeglass frame of the eyeglasses to implement data storage, physical turn on or turn off of the camera, information interaction with the mobile phone through wireless communication and setting, so as to satisfy demands of users at different states in different periods.

Any means in the motor, the motor control module, the transmission module and the interface module may be integrated or implemented by separated components, and may be of any type suitable for the local technical environment. As a non-limiting example, it may include one or more of general purpose computer, special purpose computer, microprocessor, digital signal processor (DSP) and processor based on multi-core processor architecture. The ROM may be of any type suitable for the local technical environment and may be implemented using any suitable data storage technology, such as semiconductor based on memory devices, flash memory, magnetic memory device and system, optical memory device and system, fixed memory and removable memory.

In general, the exemplary embodiments may be implemented by hardware or special purpose circuit, software, logic or any combination thereof. For example, some aspects may be implemented by hardware, while other aspects may be implemented by firmware or software which may be executed by a controller, microprocessor or other computing device, although the present disclosure is not limited thereto. While every aspect of the exemplary embodiments of the present disclosure may be described by block diagram, flow chart, or using some other illustrative representation, it should be understood that these blocks, apparatus, systems, techniques or methods described herein may be implemented by, as non-limiting examples, hardware, software, firmware, special purpose circuits or logic, general purpose hardware or controller or other computing devices, or the combination thereof.

It will be appreciated that at least some aspects of the exemplary embodiments of the present disclosure may be implemented by computer-executable instructions executed by one or more computers or other devices, such as one or more program modules. Generally speaking, program module includes thread, program, object, component, data structure, etc. that execute particular tasks or implement particular abstract data types when a processor in a computer or other device is running. The computer executable instructions may be stored on a computer readable medium such as a hard disk, optical disk, removable storage media, solid state memory, random access memory (RAM), etc. As will be realized by one of skills in the art, the function of the program modules may be combined or separated as desired in various embodiments. In addition, the function may be embodied as a whole or as a part in the firmware or hardware equivalents such as integrated circuit, field programmable gate array (FPGA), and the like.

Although specific embodiments of the present disclosure have been disclosed, those with ordinary skills in the art will understand that changes can be made to the specific embodiments without departing from the spirit and scope of the present disclosure. The scope of the present disclosure is not restricted to the specific embodiments, and it is intended that the appended claims cover any and all such applications, modifications, and embodiments within the scope of the present disclosure.

What is claimed is:

1. A device for multi-angle photographing in eyeglasses comprising:
    a camera mounted on the eyeglasses and configured to capture an image;
    at least two motors configured to drive the camera to move; and
    at least two mobile platforms, each of which is provided with a plurality of limiting stoppers, wherein the camera is connected between respective limiting stoppers of the at least two mobile platforms through the at least two motors, and wherein the camera is driven by the motors to move between the limiting stoppers of the mobile platforms to achieve multi-angle photographing.

2. The device according to claim 1, further comprising:
    a motor control module configured to control the motors to drive the camera to move between the limiting stoppers of the mobile platforms in accordance with a desired photographing angle.

3. The device according to claim 1, further comprising:
    connectors configured to connect the motors with the camera and configured to move the camera under control of the motors.

4. The device according to claim 1, further comprising:
    a transmission module configured to receive an instruction from a mobile phone or a remote device and transmit the instruction to the motor control module to control movement of the camera.

5. The device according to claim 1, further comprising:
    an interface module configured to store the image captured by the camera in a storage device.

6. The device according to claim 1, further comprising at least one of:
    a protective housing connected to the connectors and configured to accommodate the camera; and
    a switch configured to turn on or turn off the camera.

7. The device according to claim 2, further comprising:
    connectors configured to connect the motors with the camera and configured to move camera under control of the motors.

8. The device according to claim 2, further comprising:
    an interface module configured to store the image captured by the camera in a storage device.

9. The device according to claim 2, further comprising at least one of:
    a protective housing connected to the connectors and configured to accommodate the camera; and
    a switch configured to turn on or turn off the camera.

10. Eyeglasses comprising a device for multi-angle photographing, wherein the device comprises:
    a camera mounted on the eyeglasses and configured to capture an image;
    at least two motors configured to drive the camera to move; and
    at least two mobile platforms, each of which is provided with a plurality of limiting stoppers, wherein the camera is connected between respective limiting stoppers of the at least two mobile platforms through the at least two motors, and wherein the camera is driven by the motors to move between the limiting stoppers of the mobile platforms to achieve multi-angle photographing.

11. The eyeglasses according to claim 10, wherein the device further comprises:
    a motor control module configured to control the motors to drive the camera to move between the limiting stoppers of the mobile platforms in accordance with a desired photographing angle.

12. The eyeglasses according to claim 10, wherein the device further comprises:
    connectors configured to connect the motors with the camera and configured to move the camera under control of the motors.

13. The eyeglasses according to claim 11, wherein the device further comprises:
    connectors configured to connect the motors with the camera and configured to move the camera under control of the motors.

14. The eyeglasses according to claim 11, wherein the device further comprises:
    a transmission module configured to receive an instruction from a mobile phone or a remote device and transmit the instruction to the motor control module to control movement of the camera.

15. The eyeglasses according to claim 10, wherein the device further comprises:

an interface module configured to store the image captured by the camera in a storage device.

16. The eyeglasses according to claim 11, wherein the device further comprises:
an interface module configured to store the image captured by the camera in a storage device.

17. The eyeglasses according to claim 10, wherein the device further comprises at least one of:
a protective housing connected to the connectors and configured to accommodate the camera; and
a switch configured to turn on or turn off the camera.

18. The eyeglasses according to claim 11, wherein the device further comprises at least one of:
a protective housing connected to the connectors and configured to accommodate the camera; and
a switch configured to turn on or turn off the camera.

* * * * *

UNITED STATES PATENT AND TRADEMARK OFFICE
CERTIFICATE OF CORRECTION

PATENT NO. : 9,948,845 B2
APPLICATION NO. : 15/525496
DATED : April 17, 2018
INVENTOR(S) : Jun Long et al.

It is certified that error appears in the above-identified patent and that said Letters Patent is hereby corrected as shown below:

In the Claims

In Claim 7, Column 6, Line 20, delete "to move camera" and insert therefor -- to move the camera --.

Signed and Sealed this
Twelfth Day of June, 2018

Andrei Iancu
*Director of the United States Patent and Trademark Office*